(12) United States Patent  
Alameldeen et al.

(10) Patent No.: US 8,806,285 B2  
(45) Date of Patent: Aug. 12, 2014

(54) DYNAMICALLY ALLOCATABLE MEMORY ERROR MITIGATION

(75) Inventors: Alaa R. Alameldeen, Beaverton, OR (US); Ilya Wagner, Hillsboro, OR (US); Zeshan A. Chishti, Beaverton, OR (US); Wei Wu, Portland, OR (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 13/485,474

(22) Filed: May 31, 2012

(65) Prior Publication Data

US 2013/0326263 A1 Dec. 5, 2013

(51) Int. Cl.
*G11C 29/00* (2006.01)
*G06F 11/00* (2006.01)

(52) U.S. Cl.
USPC ............ 714/723; 714/763; 714/42; 365/201; 365/200

(58) Field of Classification Search
USPC ......... 714/718, 721, 723, 746, 752–758, 763, 714/767, 799, 800, 40–42, 48, 52, 54; 365/200, 201, 204, 185.09
See application file for complete search history.

(56) References Cited

U.S. PATENT DOCUMENTS

| | | | |
|---|---|---|---|
| 7,451,387 B2* | 11/2008 | Koktan et al. | 714/805 |
| 8,189,379 B2* | 5/2012 | Camp et al. | 365/185.02 |
| 2010/0281134 A1* | 11/2010 | Melen et al. | 709/217 |
| 2011/0271157 A1* | 11/2011 | Lee et al. | 714/718 |

* cited by examiner

*Primary Examiner* — Christine Tu
(74) *Attorney, Agent, or Firm* — Blakely, Sokoloff, Taylor & Zafman LLP

(57) ABSTRACT

Embodiments include a method and system of dynamically allocatable memory error mitigation. In one embodiment, a system applies an error mitigation mechanism to one of multiple groups of memory units, wherein the one group is in active use during an error test of a second group of memory units. The system deactivates and tests the second group of memory units for errors. In response to detecting an error in a memory unit of the second group, the system applies, to the memory unit of the second group having the error, the error mitigation mechanism for active use. The system then activates the second group of memory units with the error mitigation mechanism applied to the memory unit of the second group having the error.

30 Claims, 8 Drawing Sheets

DYNAMICALLY ALLOCATABLE MEMORY ERROR MITIGATION

BACKGROUND

Memory structures may experience failures due to, for example, errors in memory cells. Some memory cell errors can be identified by testing, but current testing is insufficient to address errors that arise after memories have been manufactured or shipped, and/or the testing has undesirable overhead (e.g., cost, hardware, and/or latencies).

Methods of correcting and recovering from memory cell errors exist, but to achieve a high level of error correction, systems require excessive additional hardware (e.g., additional error correction (ECC) bits for each addressable word). Achieving a high level of error correction increases the costs of producing memories, increases memory access latency, and may also occupy coveted die area that could be used for other purposes.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. In the following description and claims, the term "coupled" and its derivatives may be used. The term "coupled" herein may refer to two or more elements which are in direct contact (physically, electrically, magnetically, optically, etc.), or to two or more elements that are not in direct contact with each other, but which still interact with each other.

DETAILED DESCRIPTION

As described herein, a system dynamically applies an error mitigation mechanism to one or more memory units. In one embodiment, dynamic application of an error mitigation mechanism enables testing of memory while the memory is active. A memory is active when at least some of its memory units are operational. In one embodiment, the dynamically allocatable error mitigation mechanism provides error correction and detection using a variable-strength error correcting code (ECC). According to one embodiment, a system dynamically applies an error mitigation mechanism to memory units which are identified as needing error mitigation to operate under some or all conditions.

Figure 1:
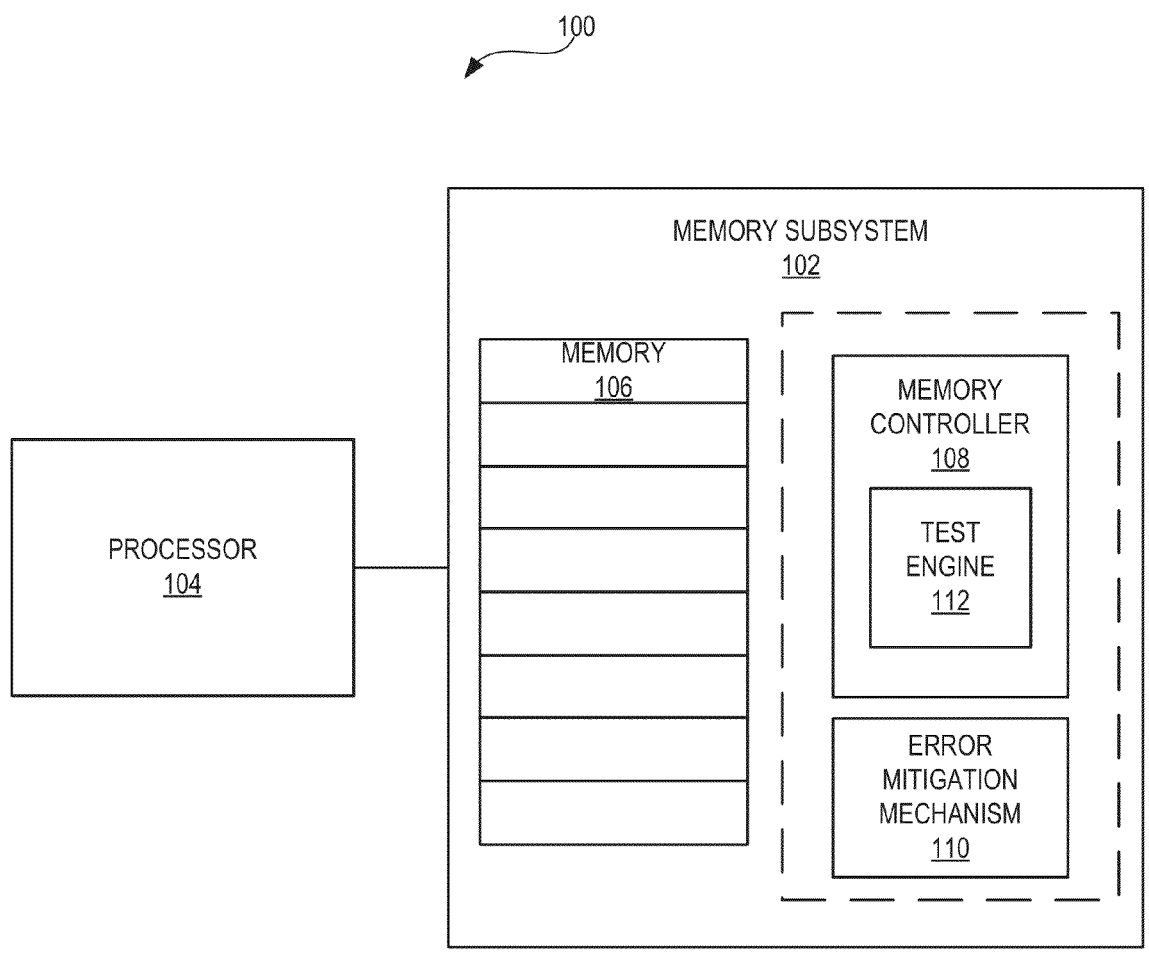
FIG. 1 is a block diagram of a system having a memory subsystem with a dynamically allocatable error mitigation mechanism according to one embodiment.

FIG. 1 is a block diagram of a system having a memory subsystem with a dynamically allocatable error mitigation mechanism according to one embodiment. System 100 represents a computing device, which includes a processor 104 coupled with a memory subsystem 102. As illustrated, memory subsystem 102 includes memory 106, memory controller 108, and error mitigation mechanism 110. Memory controller 108 can include test engine 112. In another embodiment, memory subsystem 102 is located on processor 104. In another embodiment, memory subsystem 102 is located on a separate device. In yet another embodiment, one or more parts of memory subsystem 102 are located on processor 104 and other parts of memory subsystem 102 are located on a separate device. Other system embodiments may include different elements and/or include elements in different configurations. For example, part of memory 106 could be designed as caches associated with the processor 104.

According to one embodiment, memory 106 includes a plurality of memory units Memory units can be memory cells, units of addressability such as words, cache lines, or any subset of data storage cells. As discussed above, memory 106 may encounter errors. For example, memory 106 may encounter persistent errors or transient errors. A persistent error is an error which occurs in the same location multiple times, indicating that a particular memory bit is not functioning reliably. A transient error is an error which does not occur consistently in the same location. In one embodiment, a parameter of memory 106 impacts the probability of an error occurring. For example, in one embodiment where memory 106 is a DRAM, a refresh rate impacts the likelihood and/or frequency of errors. In one embodiment where memory 106 is an SRAM, a voltage level at which memory 106 is operated impacts the likelihood and/or frequency of errors. Furthermore, errors may occur in some memory units more frequently than in other memory units. The likelihood, frequency, and/or location of errors may change over time and/or with use.

According to one embodiment, system 100 can test memory 106 to identify the location(s) of errors without significantly impacting performance or use of system 100. In one embodiment, hardware, firmware, software, or a combination thereof perform testing of memory 106. Hardware involved in testing memory 106 can reside on any part of system 100. For example, in one embodiment, memory controller 108 includes test engine 112 to perform testing of memory 106. In another embodiment, hardware involved in testing memory 106 resides on another part of system 100 (for example, caches as part of processor 104), or external to system 100.

In one embodiment, system 100 sets a parameter of memory 106 to a value which increases the probability of error and test engine 112 performs a test of memory 106 with the parameter at that value. For example, test engine 112 performs a run-time test of memory 106 upon a transition to a power-saving voltage. In one embodiment, a power-saving voltage is a minimum operating voltage. In one embodiment, a power-saving voltage is a voltage level lower than a voltage level of normal operation. According to one embodiment, system 100 applies error mitigation mechanism 110 to one group of memory units and test engine 112 performs a test on another group of inactive memory units while the one group of memory units is active. A group of memory units can include any number of memory units of memory 106. In one embodiment, the number of memory units in a group to which system 100 applies error mitigation mechanism 110 is static. For example, in one embodiment, system 100 applies error mitigation mechanism 110 to a fixed fraction (e.g., 25%) of memory units of memory 106 at a time. In another embodiment, the number of memory units in a group is dynamic. For example, in one embodiment, in some circumstances system 100 applies error mitigation mechanism 110 to one fraction (e.g., 50%) of memory units of memory 106; in other circumstances, system 100 applies error mitigation mechanism 110 to a different fraction (e.g., 25%) of memory units of memory 106. In one embodiment, system 100 applies error mitigation mechanism 110 to a contiguous group of memory units of memory 106. In another embodiment, system 100 applies error mitigation mechanism 110 to a group of memory units of memory 106 in which some or none of the memory units are contiguous.

In one embodiment, test engine 112 tests memory 106 using a traditional memory test algorithm. A traditional memory test algorithm can involve, for example, writing lines to memory with pre-defined patterns and reading back lines in a particular order. In one such embodiment, the test engine 112 compares patterns read from memory 106 with expected patterns and identifies discrepancies. In one embodiment, test engine 112 can then derive the location of failing bit(s) in memory 106. In one embodiment, system 100 can perform testing during spare cycles of processor 104 to reduce the performance impact on system 100 of memory testing.

In one embodiment, if system 100 detects that a number of errors exceeds a threshold value (e.g., more than a single bit error), system 100 can set a flag to indicate that a memory unit will need additional error mitigation. In one such embodiment, the flag is one or more bits which system 100 can set to indicate that error mitigation mechanism 110 is to be applied to a memory unit having the error(s). Setting a bit to a value may include changing the bit to the value or maintaining the value if the bit is already at the desired value. According to one embodiment, if system 100 detects that the number of errors does not exceed the threshold value, system 100 can record the location of the error(s) for comparison with the locations of later detected error(s).

In one embodiment, system 100 can differentiate memory units of memory 106 according to whether they have no errors, one error, or more than one error. According to one embodiment, system 100 can record the exact number of errors in each memory unit up to a predetermined number (e.g., up to the number of errors that can be mitigated by error mitigation mechanism 110).

According to one embodiment, this process continues until the testing algorithm completes or until system 100 detects a condition. In one embodiment, system 100 does not complete the testing algorithm if it detects that the additional error mitigation requirements for error-free operation exceed the allocatable error mitigation mechanism 110. In one such embodiment, the system detects that errors exceed a threshold in active memory units, inactive memory units, or both active and inactive memory units. System 100 can respond to detecting this condition by operating memory 106 at a value of the parameter that does not increase the probability of an error, according to one embodiment. For example, in one embodiment, system 100 operates memory 106 at a higher voltage. In one such embodiment, system 100 can deactivate error mitigation mechanism 110. In one embodiment, deactivating error mitigation mechanism 110 results in power savings. In another embodiment, system 100 can restart testing at a different value of the parameter, which has a lower probability of error. For example, in one embodiment, system 100 restarts testing at a slightly higher voltage (e.g., 10 mV above a minimum operating voltage, or some other increment above a previous voltage). In another embodiment, system 100 disables some units of memory 106 that have more errors than could be mitigated by error mitigation mechanism 110 in a way that does not affect correct execution.

In one embodiment, if the group of memory units being tested passes the test (e.g., the encountered errors do not exceed a threshold), system 100 can activate the group of memory units being tested, and begin testing another group of memory units. In one embodiment, beginning testing another group of memory units includes moving over live data from that group of memory units to the previously inactive memory units. In one embodiment, system 100 then deactivates the other group of memory units and test engine 112 performs memory testing. In another embodiment, system 100 does not move live data prior to deactivation. For example, in one embodiment where memory 106 is a cache, live data can be discarded.

According to one embodiment, system 100 can initiate a testing phase the first time a parameter of the memory is set to a value which increases a probability of errors. For example, system 100 can initiate a testing phase during the first transition of system 100 to a power-saving voltage mode. In another embodiment, system 100 initiates a testing phase the first time the parameter of a group of memory units of the memory is set to the value which increases a probability of errors. In yet another embodiment, system 100 can test memory 106 at any time. For example, system 100 can initiate testing every time a parameter value is changed, on a periodic basis such as every few days or months, in response to a user request, or at any other time. According to one embodiment, performing a test of memory 106 at run-time enables covering a variety of errors which may not be present at or immediately after manufacturing (e.g., aging-related faults). Run-time testing can also have the benefit over manufacturing-time testing of being lower cost and/or not requiring on-die non-volatile storage to store fault map data.

According to one embodiment, testing memory 106 while memory 106 is active by dynamic application of error mitigation mechanism 110 is independent of the specific mechanism used to alleviate errors in memory 106. In one embodiment, error mitigation mechanism 110 includes bits, logic, firmware, and/or software for implementing a "strong" ECC as the specific mechanism to alleviate errors. In one embodiment, a strong ECC is a code that enables recovery from errors under various expected operating conditions. In one embodiment, system 100 can protect some memory units of memory 106 by strong ECC by dynamic application of error mitigation mechanism 110. In one such embodiment, system 100 implements a variable-strength ECC via dynamic application of error mitigation mechanism 110 to memory unit(s) of memory 106.

In one such embodiment, system 100 includes dedicated ECC bits and allocatable ECC bits. For example, memory units of memory 106 can use a single-error correcting, double-error detecting (SECDED) code. In one such embodiment, each memory unit has dedicated SECDED bits. According to one embodiment, error mitigation mechanism 110 is an allocatable error mitigation mechanism which can include additional bits for implementing an ECC capable of detecting and/or correcting more errors (e.g., a four-error correcting, five-error detecting (4EC5ED) code). In one embodiment, the ECC strength for memory units of memory 106 is variable by dynamic allocation of additional ECC bits. For example, system 100 can increase the error correction capability for a memory unit from SECDED to 4EC5ED by applying allocatable error mitigation mechanism 110 to that memory unit.

In another embodiment, all ECC bits are allocatable. In one embodiment, system 100 can set the error correction capability for a memory unit to one of three or more levels of error correction capability by applying different numbers of allocatable ECC bits. For example, in one embodiment, system 100 can protect a memory unit by no error correction, single error correction (e.g., SECDED), double error correction, triple error correction, quadruple error correction (e.g., 4EC5ED), or any other level of error correction enabled by allocatable ECC bits of error mitigation mechanism 110.

In another embodiment, error mitigation mechanism 110 includes bits, logic, firmware, and/or software for setting a parameter to different values for different groups of memory units of memory 106. For example, in one such embodiment, error mitigation mechanism 110 can set the voltage of one group of memory units to a power-saving voltage, which increases the probability of an error. In one embodiment, error mitigation mechanism can set the voltage of another group of memory units to a higher voltage, which does not increase the probability of an error.

According to one embodiment, the above-described testing scheme using the dynamically allocatable error mitigation mechanism 110 enables execution with an insignificant penalty by keeping a group of memory units of memory 106 protected and available for active use, while requiring minimal additional hardware. For example, error mitigation mechanism 110 can be implemented with a small bit array for storing ECC data (e.g., one bit for each of 25% of memory units of memory 106), and a logic-implemented state machine to determine which level of ECC encoding and decoding is required for the memory units. In one such embodiment, such a state machine can be implemented with tens of state elements and a few logic gates. In one embodiment, the dynamically allocatable error mitigation mechanism 110 enables testing and dynamic error mitigation "in the field" (e.g., after manufacturing), which enables detection and mitigation of aging-related errors that may not appear if tested prior to shipping.

Figure 2:
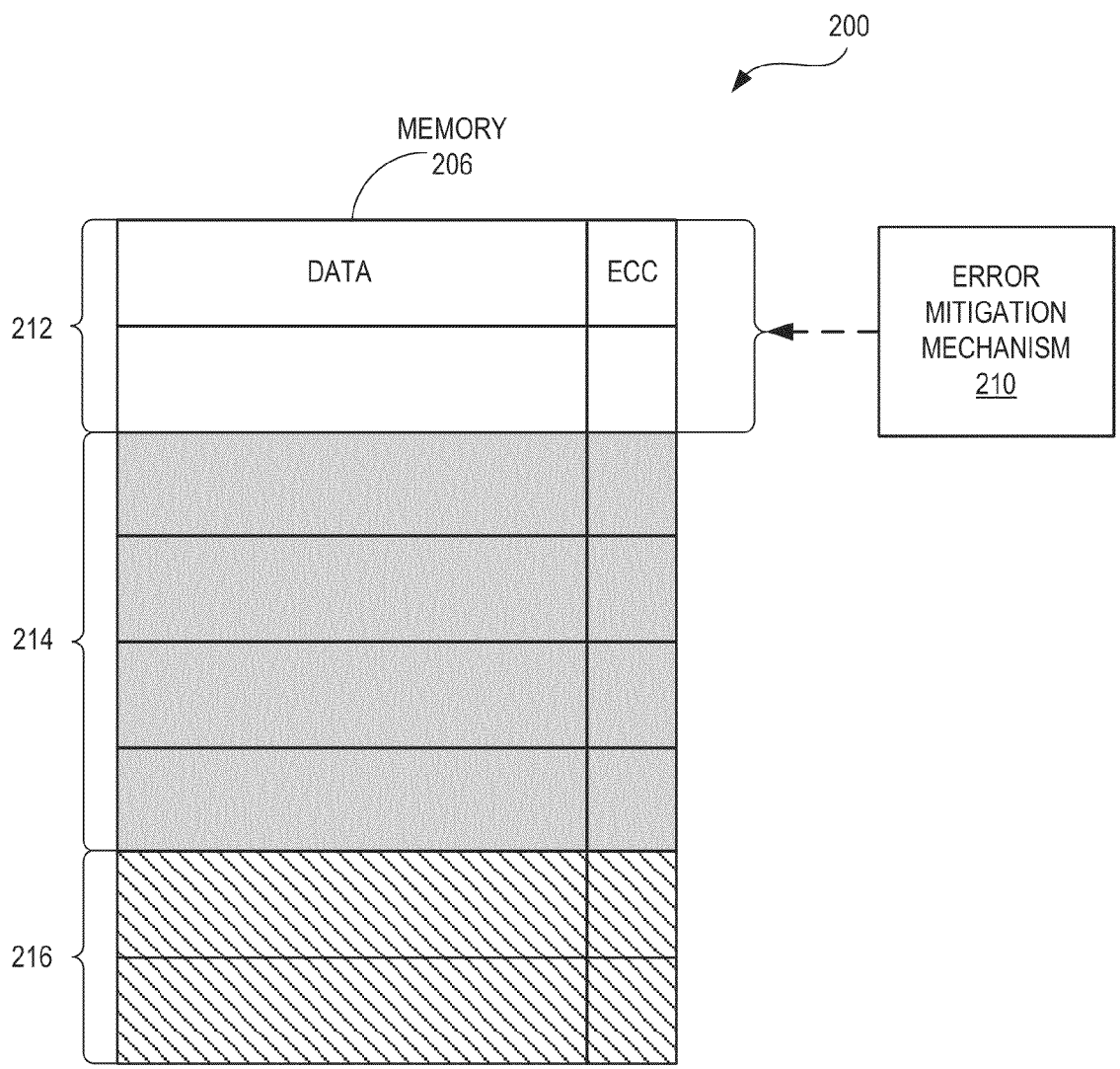
FIG. 2 is a block diagram of a memory and an error mitigation mechanism applied to a group of memory units according to one embodiment.

FIG. 2 is block diagram of a memory and an error mitigation mechanism applied to a group of memory units according to one embodiment.

Block diagram 200 illustrates a memory 206 and an error mitigation mechanism 210. In this embodiment, memory 206 includes groups 212, 214, and 216 of memory units. As illustrated, a memory unit includes data and has an associated ECC field for storing calculated parity bits or other ECC data.

According to one embodiment, a system (such as system 100 in FIG. 1) applies error mitigation mechanism 210 to group 212 of memory units. In one embodiment, applying error mitigation mechanism 210 to group 212 of memory units includes allocating an additional ECC bit(s) (not shown) to a memory unit to vary an error correction capability for the memory unit. In another embodiment, applying error mitigation mechanism 210 to group 212 of memory units includes setting a parameter of group 212 of memory units to a value which either does not increase or decreases the probability of error. In yet another embodiment, applying error mitigation mechanism 210 to group 212 of memory units can include any other means of mitigating errors.

According to one embodiment, applying error mitigation mechanism 210 to group 212 of memory units enables group 212 of memory units to be in active use without encountering errors while group 214 of memory units are deactivated and tested for errors. In one embodiment, group 216 of memory units are active and either previously tested and do not require application of the error mitigation mechanism 210 and/or have parameters set so as to not increase a probability of error. In another embodiment, group 216 of memory units are inactive.

After deactivated group 214 of memory units are tested, the system can apply error mitigation mechanism 210 to group 214 of memory units (or a fraction thereof) for active use while group 212 of memory units are deactivated and tested.

Figure 3:
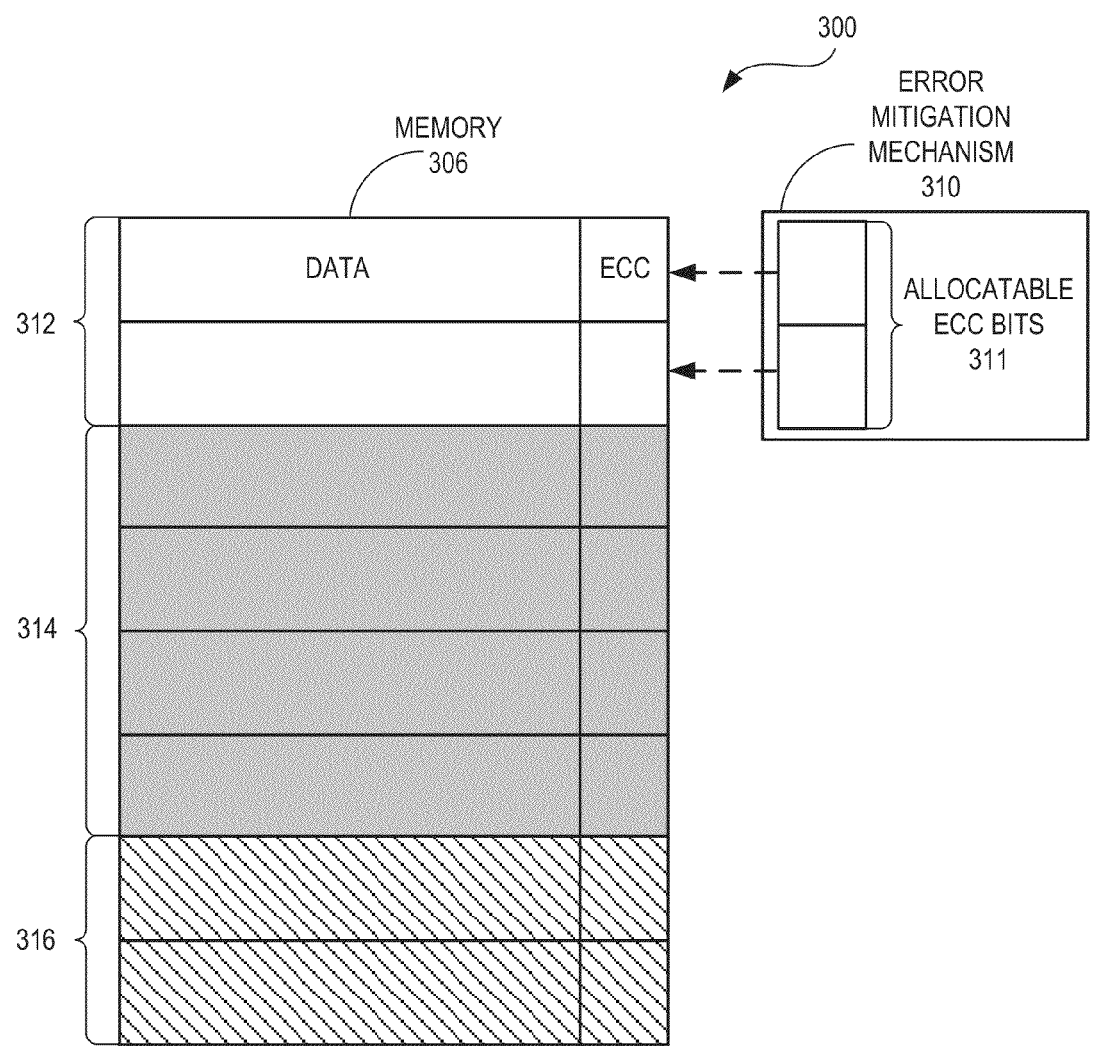
FIG. 3 is a block diagram of a memory with dynamically allocatable Error-Correcting Code (ECC) bits according to one embodiment.
Figure 4:
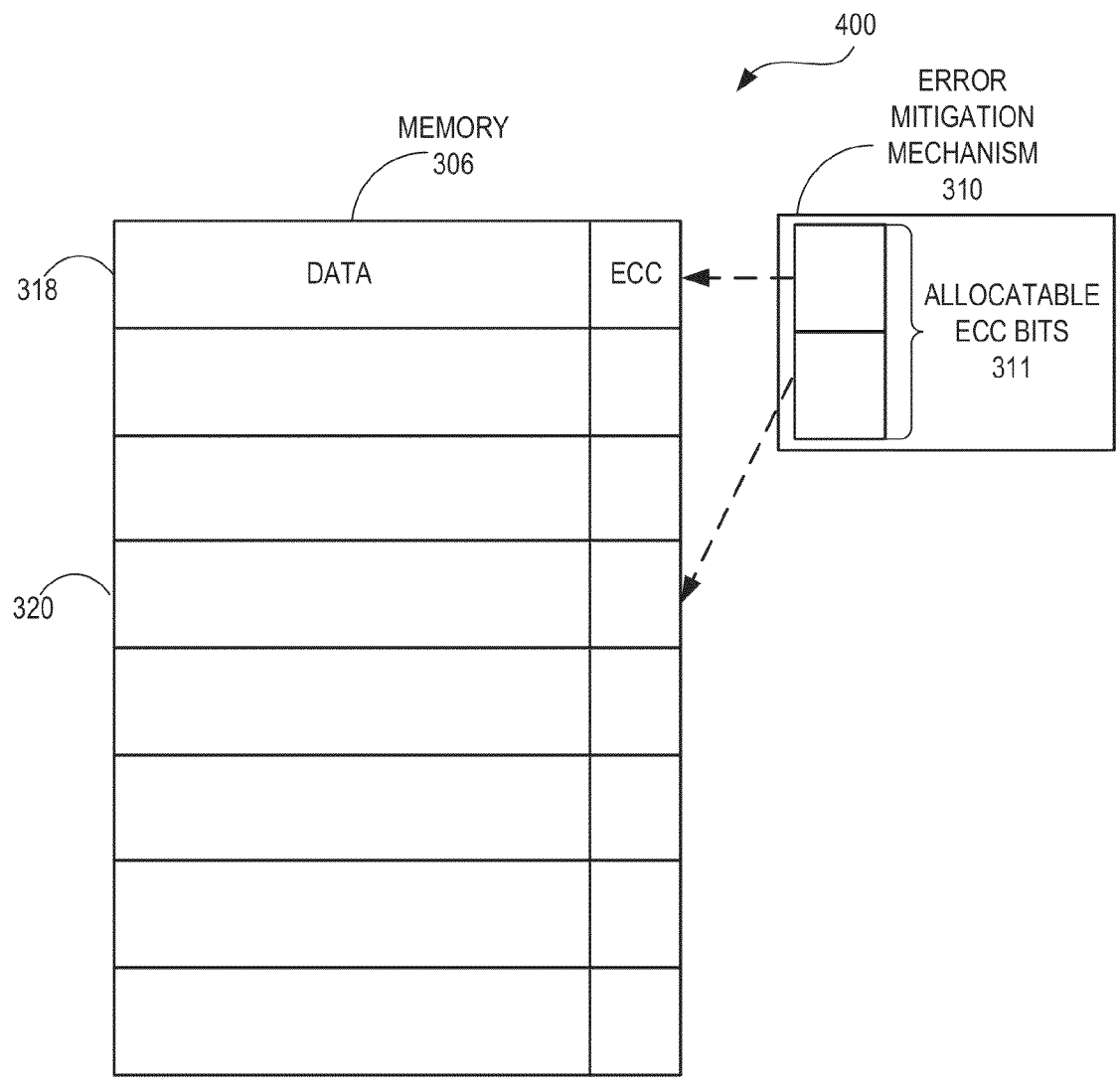
FIG. 4 is a block diagram of a memory with dynamically allocatable ECC bits according to one embodiment.

FIGS. 3 and 4 are block diagrams of a memory and an error mitigation mechanism including allocatable ECC bits according to one embodiment.

According to the embodiment in block diagram 300 of FIG. 3, error mitigation mechanism 310 includes allocatable ECC bits 311. For example, as illustrated, a system (such as system 100 in FIG. 1) applies error mitigation mechanism 310 to group 312 of memory units by allocating ECC bits 311 to group 312 of memory units. In one embodiment, allocating ECC bits 311 to group 312 of memory units varies an error correction capability for one or more memory units of group 312. For example, allocating ECC bits 311 to memory units increases the error correction and/or detection capability for group 312 of memory units.

In this embodiment, group 312 of memory units are to be in active use while the system deactivates and tests group 314 of memory units. In one embodiment, the system sets a parameter of memory 306 to a value which increases the probability of error in a memory unit. For example, the system places the memory 306 into a power-saving voltage mode, which increases the probability of error. In one embodiment, the system sets the parameter to a value for the entire memory 306. In other embodiments, the system sets the parameter to one value for one group of memory units and sets the parameter to another value for another group of memory units. In one embodiment where the parameter is a voltage level, operating memory 306 in a single voltage domain can reduce hardware requirements by eliminating hardware to maintain different voltage domains for different groups of memory units. In one embodiment, group 316 of memory units are active and either previously tested and not requiring application of the error mitigation mechanism 310 and/or have parameters set so as to not increase a probability of error. In another embodiment, group 316 memory units are inactive.

In one embodiment, the system tests for errors in group 314 of memory units with the parameter at a value which increases the probability of an error. According to one embodiment, if the system detects errors, the system can apply error mitigation mechanism 310 to the memory unit of group 314 with the error for active use with the parameter at the value which increases a probability of an error. FIG. 4 illustrates an example of memory units in active use with the error mitigation mechanism 310 applied.

After the test is complete for group 314 of memory units, a system performs a memory test of another group of memory units (e.g., group 312 of memory units, group 316 of memory units, or a fraction or combination thereof) while group 314 of memory units are in active use. In one embodiment, the system repeats testing for all groups of memory units until all (or substantially all) memory units are tested.

Block diagram 400 of FIG. 4 illustrates one embodiment in which all memory units of memory 306 have been tested and are active. As illustrated, a system (such as system 100 of FIG.

1) applies allocatable ECC bits 311 to memory unit(s) 318 and memory unit(s) 320. In one embodiment, the system applies ECC bits 311 in response to discovering errors during testing at a value of the parameter which increases the probability of an error. In one embodiment, the system applies ECC bits 311 further in response to determining that additional error mitigation is necessary for operating memory units 318 and 320 without errors at that value of the parameter. In another embodiment, the system applies allocatable ECC bits 311 to memory unit 318 and memory unit 320 for other reasons, such as due to a prediction of error occurrence in those memory units.

Figure 5:
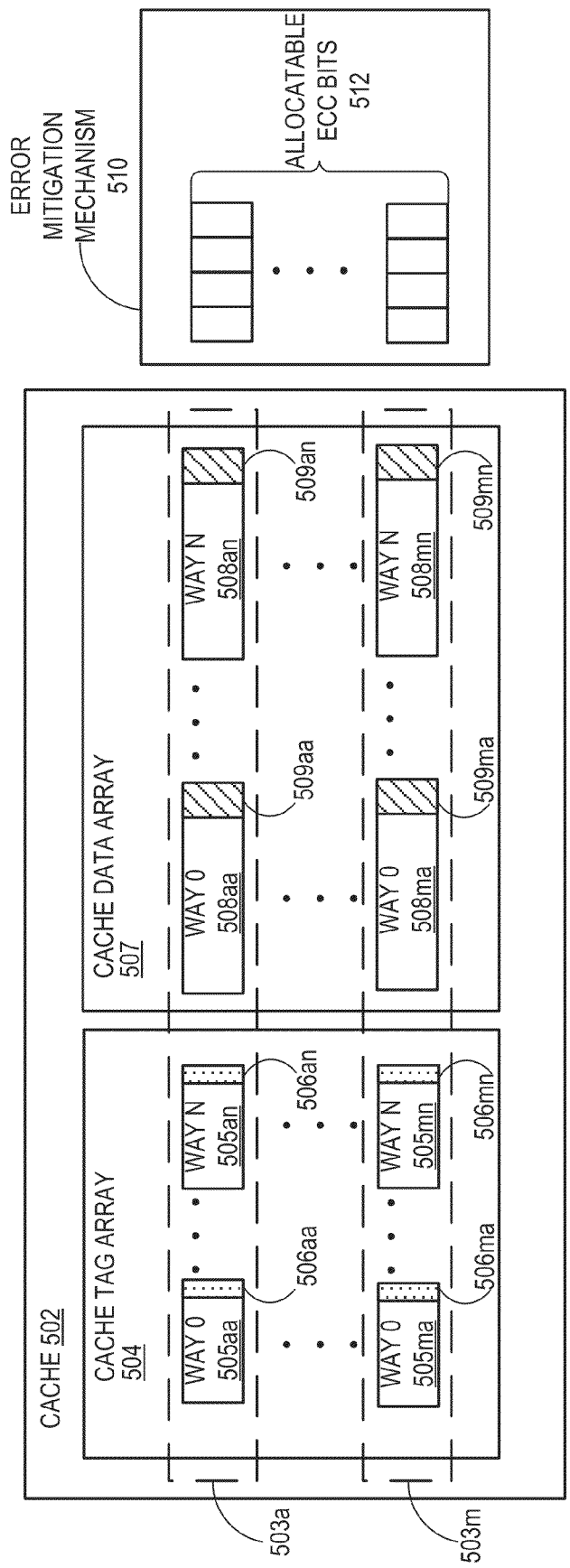
FIG. 5 is a block diagram of a cache with dynamically allocatable ECC bits according to one embodiment.

FIG. 5 is a block diagram of a cache with allocatable ECC bits according to one embodiment. In this embodiment, cache 502 is an (N+1)-way cache, and includes a cache tag array 504 and a cache data array 507. Cache 502 is organized as sets 503a-503m, and ways 0 through N. Cache data array 507 includes cache line data 508aa-508mn. Cache tag array 504 includes cache line tags 505aa-505mn, which correspond to cache line data 508aa-508mn.

According to this embodiment, cache data array 507 includes a corresponding ECC field 509aa-509mn for each cache line data 508aa-508mn. In one such embodiment, ECC fields 509aa-509mn store check bits, parity bits, or some other ECC data to provide error correction for cache line data 508aa-508mn. For example, in one embodiment, ECC fields 509aa-509mn enable SECDED for cache line data 508aa-508mn. According to one embodiment, cache 502 includes ECC encoding logic to encode data to be stored in cache line data 508aa-508mn. In one such embodiment, encoding via the ECC encoding logic generates ECC data to be stored in ECC fields 509aa-509mn. In one embodiment, cache 502 includes ECC decoding logic to decode code words, including cache line data 508aa-508mn and data stored in ECC fields 509aa-509mn.

In one embodiment, a parameter of cache 502 affects a probability of errors occurring. In one such embodiment, ECC fields 509aa-509mn are sufficient for operating cache 502 without errors at one value of the parameter, but insufficient for operating cache 502 without errors at another value of the parameter. For example, in one embodiment where ECC fields 509aa-509mn enable SECDED, the SECDED protection is sufficient to operate cache 502 without errors at a normal operating voltage, but insufficient to operate cache 502 without errors at a lower power-saving voltage.

In one such embodiment, application of allocatable ECC bits 512 provides extended ECC protection to a group of cache lines in cache 502, while the remaining cache lines are protected by their standard cache protection mechanism. In one embodiment, cache line tags 505aa-505mn include "Extended ECC" flags 506aa-506mn to indicate whether the corresponding cache line is protected (or is to be protected) by error mitigation mechanism 510. For example, Extended ECC flags 506aa-506mn indicate whether to allocate one or more of allocatable ECC bits 512 to that cache line.

In this example, error mitigation mechanism 510 includes fewer allocatable ECC bits than cache lines of cache 502. For example, in one embodiment, each set includes sixteen cache lines, and error mitigation mechanism 510 includes four allocatable ECC bits per set. In one such embodiment, implementing cache 502 with fewer allocatable ECC bits 512 than cache lines reduces hardware and/or expenses. Therefore, in this embodiment, the system can protect a group of the cache lines in each set at one time by allocating allocatable ECC bits 512. In one embodiment, when cache 502 is in a mode which results in a higher probability of errors, only the cache lines to which the allocatable ECC bits are applied, and/or cache lines that have been tested, are active and contain live data. In one such embodiment, the remaining cache lines are inactive and/or under test.

Similar to what is described with reference to FIG. 1, a system can test the cache lines of cache 502 to determine whether or not there are error(s), and/or determine the location of the error(s). In one embodiment, the system performing the test of cache lines on cache 502 includes hardware, firmware, and/or software. In one embodiment, part or all of the system performing the test of cache lines is located on cache 502. In another embodiment, part or all of the system performing the test of cache lines is located external to cache 502 and is coupled with cache 502.

According to one embodiment, before entering a testing phase, the system performs a cache flush. For example, in one embodiment, the system resets Extended ECC flags 506aa-506mn, resets valid bits for inactive cache lines, and causes any modified cache line data 508aa-508mn to be written back to memory. In one embodiment, the system performs a cache flush on the entire cache 502 prior to testing. In another embodiment, the system performs a cache flush for the cache lines that will be deactivated for testing. In one such embodiment, the system employs an algorithm in which the data in the active cache lines remains in the cache 502. For example, the data in the cache lines to which the allocatable ECC bits are applied and/or previously tested cache lines remain in the cache 502. One such algorithm has a lower performance impact due to not flushing the entire cache 502.

In one embodiment, after a full or partial cache flush, the system changes a parameter to a value which increases a probability of errors. For example, the system reduces the operating voltage to a power-saving voltage. According to one embodiment, the system allocates allocatable ECC bits 512 to a group of cache lines. For example, in one embodiment, the system can allocate the allocatable ECC bits 512 sequentially to the first four cache lines in each set. In one embodiment, the system deactivates the remaining cache lines (4 through N). In one embodiment, deactivating a cache line includes modifying the cache replacement algorithm of the cache 502 to not allocate new data to the deactivated cache lines. In one embodiment, a percentage of the capacity of cache 502 is deactivated, but cache 502 is able to operate without errors during the testing phase due to the error mitigation mechanism's application to the active cache lines.

In one embodiment, during testing, on each cache write to the active cache lines, the system sends the data being written to ECC encode logic. In one such embodiment, the generated ECC is split between the cache line's standard ECC field (e.g., 509aa) and the allocatable ECC bit(s) 512 which were applied to that cache line. In one embodiment, on a read access, the system sends the stored data and ECC data to the ECC decoder, which then outputs corrected line data and/or the number of encountered errors. According to one such embodiment, if the number of errors detected is more than a threshold, the system sets the cache line's Extended ECC flag.

In one embodiment, if the number of errors encountered does not exceed a threshold, the system can record the location of the error. In one such embodiment, the system records the location of the error into the cache line's tag (e.g., 505aa). If another error occurs in the same cache line, the system can compare the location of the new error with the stored location of the previous error. In one such embodiment, tag matching hardware of cache 502 performs the comparison of the new error's location to a previous error's location. In one such embodiment, a 'hit' in the tag array indicates the new error is in the same location as the previous error, while a 'miss' signifies the new error is in a different location. In one embodiment, a miss indicates that the cache line has a multi-bit error. In one embodiment, if the system detects that a multi-bit error exceeds a threshold, the system sets the cache line's Extended ECC flag.

In one embodiment, the system can also detect errors in the active group of cache lines which is not actively "under test." In one such embodiment, if a number of detected errors exceeds a threshold value, the system sets the Extended ECC flag (e.g., 506aa) of the cache line to indicate that additional error mitigation may be necessary to operate the cache line without errors under some or all conditions.

In one embodiment, the above described mechanism enables identification of the exact number of errors in each cache line by conducting the test on one group of cache lines of the cache 502 at a time. In one such embodiment, the system can use the tags corresponding to the group of cache lines under test to store the location(s) of distinct error(s) for each of the tested cache lines. In one such embodiment, the system does not overwrite other tag status bits when recording error locations.

In one embodiment, cache testing has a low overhead. For example, in one embodiment, testing of cache 502 has a latency of tens of seconds for a 2 MB 16-way set associative cache according to algorithms such as an Active Neighborhood Pattern Sensitive Faults (ANPSFs) algorithm. According to one embodiment, the system can amortize the testing penalty by using storage to save testing results. For example, in one embodiment, the system can save the values in Extended ECC flags 506aa-506mn and in allocatable ECC bits 512 in non-volatile storage between system reboots.

Figure 6:
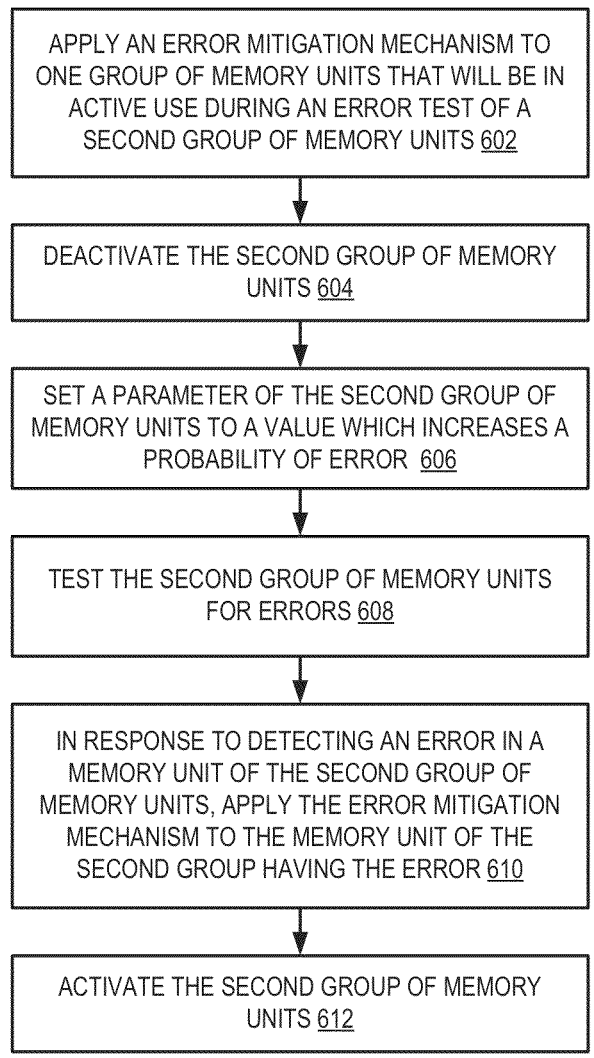
FIG. 6 is a flow diagram of a process including testing a memory while the memory is in active use and dynamic application of an error mitigation mechanism.

FIG. 6 is a flow diagram of a process including testing a memory while the memory is in active use and dynamic allocation of an error mitigation mechanism. In one embodiment, a system (e.g., system 100 of FIG. 1) applies an error mitigation mechanism to one group of memory units (e.g., memory units 212 of FIG. 2) that will be in active use during an error test of a second group of memory units, 602.

In one embodiment, the system deactivates the second group of memory units, 604. The second group of memory units can include the memory units other than the one group (e.g., memory units 214 and 216 of FIG. 2), or a subset of the memory units other than the one group (e.g., memory units 214 of FIG. 2).

In one embodiment, the system sets a parameter of the second group of memory units to a value which increases a probability of error, 606. For example, the system decreases a memory refresh rate or an operating voltage level.

In one embodiment, the system tests the second group of memory units for errors, 608. For example, the system implements a testing algorithm similar to what is described above with reference to FIG. 1.

In one embodiment, in response to detecting an error in a memory unit of the second group of memory units, the system applies the error mitigation mechanism to the memory unit of the second group having the error, 610.

In one embodiment, the system activates the second group of memory units, 612. According to one embodiment, the system repeats operations 602-612 until all (or substantially all) memory units have been tested.

Figure 7:
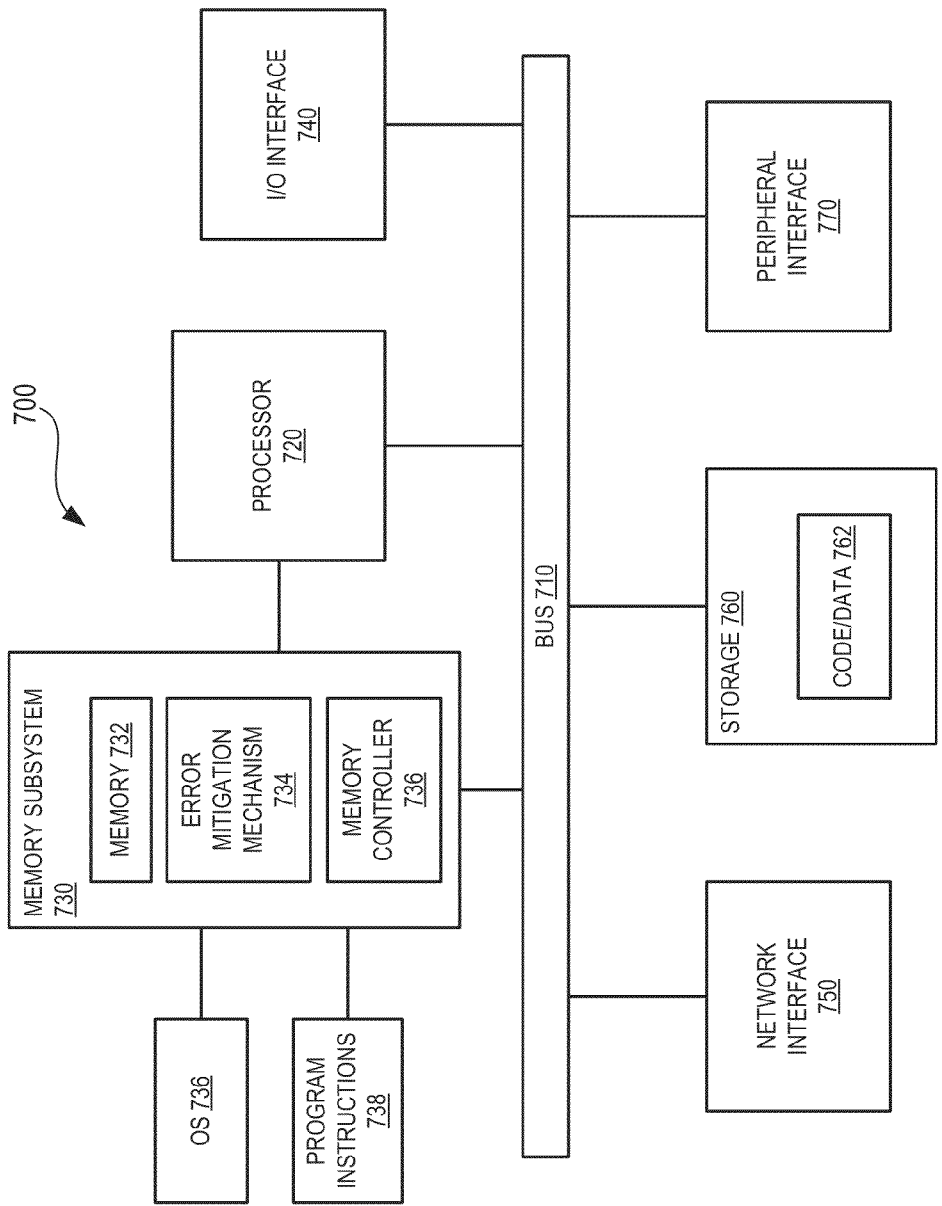
FIG. 7 is a block diagram of a computing system with a dynamically allocatable error mitigation mechanism.

FIG. 7 is a block diagram of a computing system with a dynamically allocatable error mitigation mechanism.

System 700 represents a computing device in accordance with any embodiment described herein, and can be a laptop computer, a desktop computer, a server, a gaming or entertainment control system, a scanner, copier, printer, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can include one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 can represent main memory, cache, or any other memory (e.g., any device providing storage for code to be executed by processor 720 or data values) for system 700. Memory subsystem 730 includes memory 732, which represents one or more memory devices that can include read-only memory (ROM), flash memory, one or more varieties of random access memory (RAM), or other memory devices, or a combination of such devices. Memory subsystem 730 includes memory controller 736 and error mitigation mechanism 734. In one embodiment, memory controller 736 can control read and write operations to and from memory 732, and includes test control logic (e.g., a test engine) for performing tests of memory 732, in accordance with any embodiment described herein. In one embodiment, memory subsystem 730 is located on processor 720. In another embodiment, memory subsystem 730 is located on a separate device. In yet another embodiment, one or more parts of memory subsystem 730 are located on processor 720 and other parts of memory subsystem 730 are located on a separate device. In one embodiment, part of memory 732 and error mitigation mechanism 734 could be designed as caches and included as part of processor 720.

Memory subsystem 730 can store and host, among other things, operating system (OS) 736 to provide a software platform for execution of instructions in system 700. Additionally, other program instructions 738 are stored and executed from memory subsystem 730 to provide the logic and the processing of system 700. OS 736 and program instructions 738 are executed by processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

In one embodiment, bus 710 includes a data bus that is a data bus included in memory subsystem 730 over which processor 730 can read values from memory 732. The additional line shown linking processor 720 to memory subsystem 730 represents a command bus over which processor 720 provides commands and addresses to access memory 732.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces.

Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can also be generically considered to be a "memory." Whereas storage 760 is nonvolatile, memory 720 can include volatile memory (i.e., the value or state of the data is indeterminate if power is interrupted to system 700).

Peripheral interface 770 can include any hardware interface not specifically mentioned above. Peripherals refer generally to devices that connect dependently to system 700. A dependent connection is one where system 700 provides the software and/or hardware platform on which operation executes, and with which a user interacts.

Various components described herein can be a means for performing the operations or functions described. Each component described herein includes software, hardware, or a combination of these. The components can be implemented as software modules, firmware modules, hardware modules, special-purpose hardware (e.g., application specific hardware, application specific integrated circuits (ASICs), digital signal processors (DSPs), or other special-purpose hardware), embedded controllers, hardwired circuitry, or as any combination of software, firmware, and/or hardware.

Figure 8:
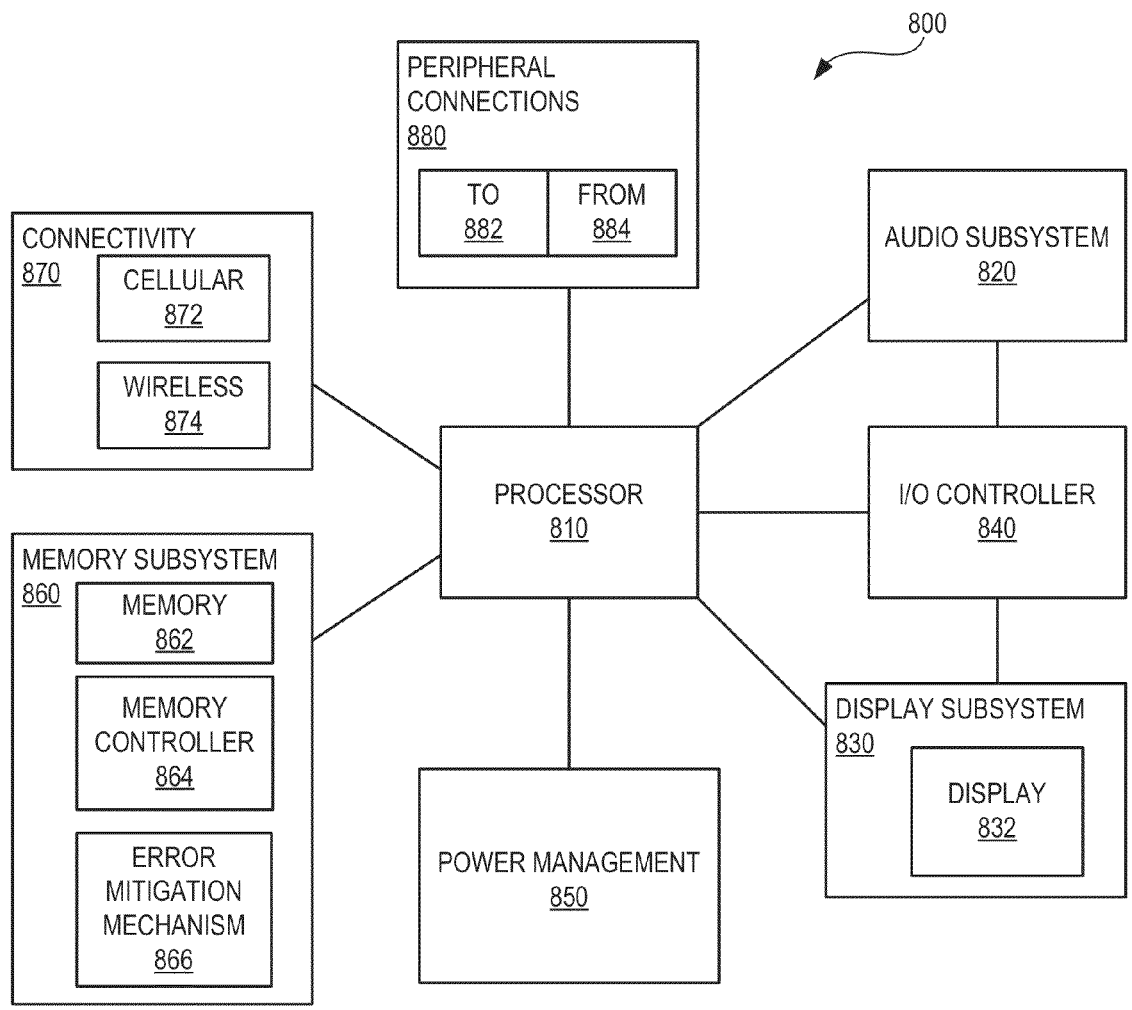
FIG. 8 is a block diagram of an embodiment of a mobile device in which a dynamically allocatable error mitigation mechanism can be used.

FIG. 8 is a block diagram of an embodiment of a mobile device in which a dynamically allocatable error mitigation mechanism can be used. Device 800 represents a mobile computing device, such as a computing tablet, a mobile phone or smartphone, a wireless-enabled e-reader, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. In one embodiment, processor 810 includes optical interface components in addition to a processor die. Thus, the processor die and photonic components are in the same package. Such a processor package can interface optically with an optical connector in accordance with any embodiment described herein.

The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display 832, which includes the particular screen or hardware device used to provide a display to a user. In one embodiment, display 832 includes logic separate from processor 810 to perform at least some processing related to the display. In one embodiment, display subsystem 830 includes a touchscreen device that provides both output to and input from a user.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem 832 includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features).

Memory subsystem 860 includes memory 862 for storing information in device 800. Memory 862 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800. Memory subsystem 860 includes memory controller 864 and error mitigation mechanism 866. In one embodiment, memory controller 864 can control read and write operations to and from memory 862, and includes test control logic (e.g., a test engine) for performing tests of memory 862, in accordance with any embodiment described herein. In one embodiment, memory subsystem 860 is located on processor 810. In another embodiment, memory subsystem 860 is located on a separate device. In yet another embodiment, one or more parts of memory subsystem 860 are located on processor 810 and other parts of memory subsystem 860 are located on a separate device. In one embodiment, part of memory 862 and error mitigation mechanism 866 could be designed as caches and included as part of processor 810.

In one embodiment, device 800 includes power management 850 that manages battery power usage, charging of the battery, and features related to power saving operation. Power management 850 can initiate a transition between two or more power states for system 800, or for select sub-parts of system 800. In one embodiment, when power management 850 initiates a transition to a power-saving mode for memory 862, memory controller 864 performs a test for errors on memory 862. In one such embodiment, memory controller 864 dynamically applies error mitigation mechanism 866 to a group of memory units of memory 862, which enables at least some memory units of memory 862 to remain active during the test.

Connectivity 870 includes hardware devices (e.g., wireless and/or wired connectors and communication hardware) and software components (e.g., drivers, protocol stacks) to enable device 800 to communicate with external devices. The device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

We claim:

1. A method comprising:
    applying an error mitigation mechanism to one of multiple groups of memory units, wherein the one group is in active use during an error test of a second group of memory units;
    deactivating the second group of memory units;
    testing the second group of memory units for errors;
    in response to detecting an error in a memory unit of the second group, applying, to the memory unit of the second group having the error, the error mitigation mechanism for active use; and
    activating the second group of memory units with the error mitigation mechanism applied to the memory unit of the second group having the error.

2. The method of claim 1, wherein:
    applying the error mitigation mechanism to the one group of memory units comprises allocating an additional error correction code (ECC) bit to the one group of memory units to vary an error correction capability for the one group of memory units.

3. The method of claim 1, further comprising prior to the testing of the second group of memory units for errors:
    setting a parameter of the second group of memory units to a value which increases a probability of error in the second group of memory units, wherein
    applying the error mitigation mechanism to the memory unit of the second group having the error comprises applying the error mitigation mechanism for active use with the parameter at the value which increases the probability of error.

4. The method of claim 3, wherein setting the parameter of the second group of memory units to the value which increases the probability of error further comprises:
    setting the parameter of all of the multiple groups of memory units to the value which increases the probability of error.

5. The method of claim 3, wherein:
    the parameter comprises a voltage level; and
    the value of the parameter which increases the probability of error corresponds to a power-saving voltage level.

6. The method of claim 3, wherein the multiple groups of memory units comprise N groups of memory units, and wherein the method further comprises for each ith group of memory units, wherein $1 \leq i \leq N$:
    applying the error mitigation mechanism to another group of the multiple groups of memory units, wherein the another group is in active use during an error test of the ith group of memory units;
    deactivating the ith group of memory units;
    testing the ith group of memory units for errors;
    in response to detecting an error in a memory unit of the ith group, applying, to the memory unit of the ith group having the error, the error mitigation mechanism for active use; and
    activating the ith group of memory units with the error mitigation mechanism applied to the memory unit of the ith group having the error.

7. The method of claim 6, further comprising:
    in response to detecting that a number of errors in the N groups of memory units exceeds a threshold value, operating the N groups of memory units at a second value of the parameter which does not increase the probability of error.

8. The method of claim 7, further comprising:
in response to detecting that the number of errors in the N groups of memory units exceeds the threshold value and operating the N groups of memory units at the second value of the parameter which does not increase the probability of error, deactivating the error mitigation mechanism.

9. The method of claim 6, further comprising:
in response to detecting that a number of errors in the N groups of memory units exceeds a threshold value, deactivating, for active use, memory units of the N groups of memory units having errors.

10. The method of claim 3, wherein:
the testing of the second group of memory units for errors is performed in response to setting, for a first time during operation of the second group of memory units, the parameter of the second group of memory units to the value which increases the probability of error.

11. The method of claim 1, wherein:
applying the error mitigation mechanism comprises setting a parameter of the second group of memory units to a value which does not increase the probability of error in the second group of memory units.

12. A system comprising:
a display;
a memory coupled with a processor, the memory comprising multiple groups of memory units;
a memory controller coupled with the memory, the memory controller to apply an error mitigation mechanism to one of multiple groups of memory units and deactivate a second group of the multiple groups of memory units, wherein the one group is in active use during an error test of a second group of memory units; and
a test engine to test the second group of memory units for errors,
wherein in response to detecting an error in a memory unit of the second group, the memory controller is to apply, to the memory unit of the second group having the error, the error mitigation mechanism for active use and activate the second group of memory units with the error mitigation mechanism applied to the memory unit of the second group having the error.

13. The system of claim 12, wherein the memory controller to apply the error mitigation mechanism to the one group of memory units comprises:
the memory controller to allocate an additional error correction code (ECC) bit to the one group of memory units to vary an error correction capability for the one group of memory units.

14. The system of claim 12, wherein the memory controller is to further:
set a parameter of the second group of memory units to a value which increases a probability of error in the second group of memory units,
wherein the memory controller to apply the error mitigation mechanism to the memory unit of the second group having the error comprises the memory controller to apply the error mitigation mechanism for active use with the parameter at the value which increases the probability of error.

15. The system of claim 14, wherein the memory controller to set the parameter of the second group of memory units to the value which increases the probability of error further comprises:
the memory controller to set the parameter of all of the multiple groups of memory units of the memory to the value which increases the probability of error.

16. The system of claim 14, wherein:
the parameter comprises a voltage level; and
the value of the parameter which increases the probability of error corresponds to a power-saving voltage level.

17. The system of claim 14, wherein the multiple groups of memory units comprise N groups of memory units, and wherein for each ith group of memory units, wherein $1 \leq i \leq N$:
the memory controller is to apply the error mitigation mechanism to another group of the multiple groups of memory units and deactivate the ith group of memory units, wherein the another group is in active use during an error test of the ith group of memory units;
the test engine is to test the ith group of memory units for errors; and
wherein in response to detecting an error in a memory unit of the ith group, the memory controller is to apply, to the memory unit of the ith group having the error, the error mitigation mechanism for active use and activate the ith group of memory units with the error mitigation mechanism applied to the memory unit of the second group having the error.

18. The system of claim 17, wherein the memory controller is to further:
in response to detecting that a number of errors in the N groups of memory units exceeds a threshold value, operate the N groups of memory units at a second value of the parameter which does not increase the probability of error.

19. The system of claim 14, wherein:
the test engine is to test the second group of memory units for errors in response to the parameter of the second group of memory units being set, for a first time during operation of the second group of memory units, to the value which increases the probability of error.

20. The system of claim 12, wherein the memory controller to apply the error mitigation mechanism comprises:
the memory controller to set a parameter of the second group of memory units to a value which does not increase the probability of error in the second group of memory units.

21. An apparatus comprising:
a memory controller to couple with a memory having multiple groups of memory units, the memory controller to apply an error mitigation mechanism to one of the multiple groups of memory units and deactivate a second of the multiple groups of memory units, and wherein the one group of memory units is to be in active use during an error test of the second group of memory units; and
a test engine to test the second group of memory units for errors,
wherein in response to detecting an error in a memory unit of the second group, the memory controller is to apply, to the memory unit of the second group having the error, the error mitigation mechanism for active use and activate the second group of memory units with the error mitigation mechanism applied to the memory unit of the second group having the error.

22. The apparatus of claim 21, wherein the memory controller to apply the error mitigation mechanism to the one group of memory units comprises:
the memory controller to allocate an additional error correction code (ECC) bit to the one group of memory units to vary an error correction capability for the one group of memory units.

23. The apparatus of claim 21, wherein the memory controller is to further:
set a parameter of the second group of memory units to a value which increases a probability of error in the second group of memory units,
wherein the memory controller to apply the error mitigation mechanism to the memory unit of the second group having the error comprises the memory controller to apply the error mitigation mechanism for active use with the parameter at the value which increases the probability of error.

24. The apparatus of claim 23, wherein the memory controller to set the parameter of the second group of memory units to the value which increases the probability of error further comprises:
the memory controller to set the parameter of all of the multiple groups of memory units of the memory to the value which increases the probability of error.

25. The apparatus of claim 23, wherein:
the parameter comprises a voltage level; and
the value of the parameter which increases the probability of error corresponds to a power-saving voltage level.

26. The apparatus of claim 23, wherein the multiple groups of memory units comprise N groups of memory units, and wherein for each ith group of memory units, wherein 1≤i≤N:
the memory controller is to apply the error mitigation mechanism to another group of the multiple groups of memory units and deactivate the ith group of memory units, wherein the another group is in active use during an error test of the ith group of memory units;
the test engine is to test the ith group of memory units for errors; and
wherein in response to detecting an error in a memory unit of the ith group, the memory controller is to apply, to the memory unit of the ith group having the error, the error mitigation mechanism for active use and activate the ith group of memory units with the error mitigation mechanism applied to the memory unit of the second group having the error.

27. The apparatus of claim 26, wherein the memory controller is to further:
in response to detecting that a number of errors in the N groups of memory units exceeds a threshold value, operate the N groups of memory units at a second value of the parameter which does not increase the probability of error.

28. The apparatus of claim 26, wherein the memory controller is to further:
in response to detecting that a number of errors in the N groups of memory units exceeds a threshold value, deactivate, for active use, memory units of the N groups of memory units having errors.

29. The apparatus of claim 23, wherein:
the test engine is to test the second group of memory units for errors in response to the parameter of the second group of memory units being set, for a first time during operation of the second group of memory units, to the value which increases the probability of error.

30. The apparatus of claim 21, wherein the memory controller to apply the error mitigation mechanism comprises:
the memory controller to set a parameter of the second group of memory units to a value which does not increase the probability of error in the second group of memory units.

* * * * *